April 13, 1937.   R. BRANDES   2,077,164
PRELIMINARY MATURING OF ALKALI CELLULOSE
Filed Jan. 7, 1935
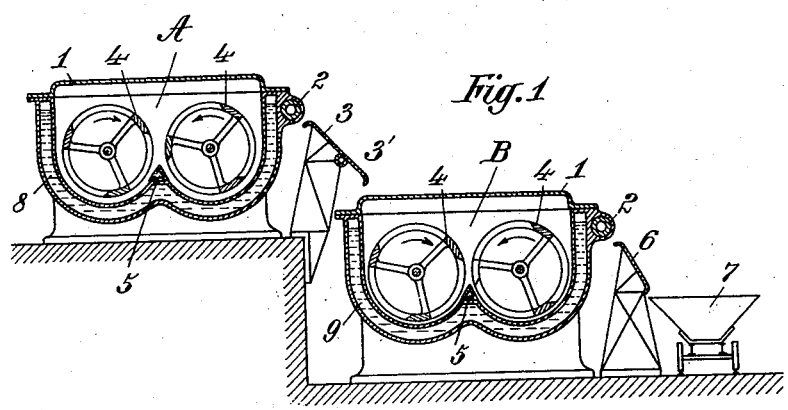
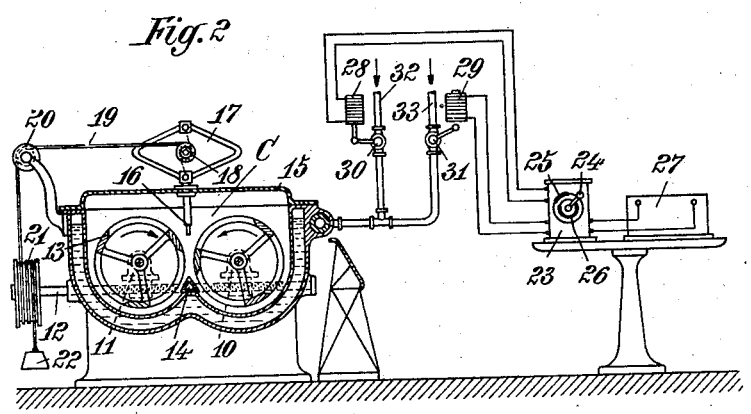

Patented Apr. 13, 1937

2,077,164

UNITED STATES PATENT OFFICE 2,077,164

PRELIMINARY MATURING OF ALKALI-CELLULOSE

Rudolf Brandes, Chemnitz, Germany

Application January 7, 1935, Serial No. 802
In Germany January 23, 1934

11 Claims. (Cl. 260—10)

The invention relates to a process for the accelerated preliminary maturing of alkali-cellulose. According to the hitherto usual way, the expressed alkali-cellulose is, for the purpose of preliminary maturing, shredded, put into boxes after being so shredded, and then allowed to mature preliminarily for several days in a room heated to or maintained at a moderate temperature. Proposals have not been lacking to shorten and thus to cheapen this protracted operation. Even the complete omission of the preliminary maturing of alkali-cellulose has already been frequently mentioned in literature, but this process, in which, as is known, the alkali-cellulose undergoes an increase of dispersivity cannot usually be dispensed with. It is known to the expert that the viscosity of the viscose to be made depends to a high degree on the preliminary maturing of the alkali-cellulose and that certain upper limits are placed on the spinning viscosity.

It has been endeavoured to carry out at elevated temperatures and with reduction of the storage time to a few hours the preliminary maturing heretofore carried out at moderate temperatures and with rather long storage. Thus there is known for example a proposal according to which the shredded alkali-cellulose is heated in a rotating drum at temperatures of 50–60° C. There are however important objects to such a mode of working because there is the possibility that in that case the further treatment of the artificial fibres would produce products with reduced physical properties.

Other proposals have for their object making the mercerization and preliminary maturing processes continuous, endless cellulose strips being presented for treatment. Such processes are accompanied by the disadvantage that they require an apparatus which differs very much from that ordinarily employed and consequently in very many cases cannot be carried out for this practical reason. Also these continuous processes have not yet been tested out in practice to an adequate extent.

According to the invention the preliminary maturing of the alkali-cellulose is effected in such a manner that it is subjected first to a mixing and loosening process at elevated temperature and then to a shredding at a temperature that is normal or gradually becomes normal.

Exhaustive experiments have shown that a good artificial silk, staple fibre etc. with good physical properties can be obtained when the expressed alkali-cellulose material is put into a shredder heated to high temperatures, for example 50° C., and first of all treated for about one hour at this temperature. In this case the shredder is adjusted in such a manner that first there is only a mixing and loosening process and not at this stage a shredding process. Only after the expiration of this period of time there begins the shredding proper, and the temperature is allowed to fall gradually and indeed to such an extent that the degree of disintegration increases so that at the conclusion of the shredding normal temperature is obtained which allows the xanthation to take place immediately. The maximum working temperature and also the period of the action of the elevated temperatures depend of course upon the character of the cellulose to be treated. The total duration of this working process usually does not exceed four hours but it may be considerably shorter. During the working process the shredder is advantageously kept well closed for the purpose of preventing vaporization of water and also for avoiding the danger of the effect of air.

In carrying out the process variations are possible in several directions. Thus for example the process may be carried out in a single operation, the mixing and loosening processes at high temperature and then consecutively the shredding at low temperature being effected for example in the same receptacle. This has the advantage of simplicity but requires a changing of working temperatures or changing temperature effects from outside on the shredder. The procedure may however be such that two receptacles are used; in the first there is carried out the first part of the process at a high temperature which remains constant, and then the charge is transferred into the second receptacle, which is not heated or is even cooled, so that the maturing material therein is cooled down to room temperature.

The loosening and shredding may be effected both in the first part of the process and in the second part of the process either with a fixed shredder or adjustably with a gradual change so that a changing degree of shredding results. The temperatures in the two parts of the process may be dealt with in an analogous manner. Preferably varying working conditions will be used in the second part of the process.

In order to facilitate regulation of the working conditions there may be employed devices that automatically control or maintain a definite relation between an adjusted degree of shredding and an adjusted working temperature; advantageously these devices are also such that the said relationship is adjustable within certain limits so that the peculiarities of the material can be suited. The adjustment of the degree of shredding may in this case be carried out in such a manner inter alia that one or both blade shafts of the shredder is or are moved in a direction parallel to itself or themselves until the desired degree of shredding, i. e., the desired depth of engagement of the toothed covering is obtained.

The process can in practice be still further automatized by employing a periodically regulated switch gear for automatically varying the working temperature and/or the depth of engagement of the shredding devices. Then, for example by adjusting different marks, contacts, etc., on the time scale of the switch gear, there can be fixed any desired temporal division for the automatic production of the desired alterations of the temperature and of the degree of shredding.

In the accompanying drawing, which is purely diagrammatic, the application of the invention is explained by means of two constructional examples.

In Fig. 1 the process according to the invention is carried out in two shredders A and B. The shredder A serves for the carrying out of the first step of the process (high temperature, low shredding degree or mere loosening). After this step has been completed the cover 1 of the shredder A is raised, the latter is tipped up about the shaft 2, and the material to be shredded is poured over an incline 3 into the open shredder B. The incline 3 contains a hinged part 3', which can be swung up so as to be out of the way when the shredder B is tipped up.

After closing the shredder B there is carried out therein as the second operation, the second step of the process (low temperature; higher degree of shredding). The higher degree of shredding in the shredder B is indicated by the narrower interspace between the blade drum 4 and the toothed portion 5. After the completion of this operation the content of the shredder is, by tipping it up, emptied into a transport vessel 7 over the incline 6.

The two shredders are surrounded by hollow peripheral walls indicated at 8 and 9 respectively. The hollow peripheral wall of the shredder A is connected to a conduit for supplying a heating medium and the hollow peripheral wall of the shredder B is connected to a supply of cooling water. For the sake of simplicity the supply and outlet conduits of the heating and cooling media are not shown; if required the connections may be made co-axially to the shaft 2 in order to render it unnecessary to remove the connections for the purpose of tipping the shredders.

In Fig. 2 there is shown an apparatus for carrying out the process according to the invention in a single shredder C. The shredder C is built in a manner similar to that of the shredders A and B, but the blade shafts 10 are journalled in bearings 11 which can be moved horizontally by means of a screw spindle 12 so that by turning the spindle there is produced a change in the depth of engagement between the teeth of the blades 13 and of the toothed portion 14.

Through the cover 15 of the shredder there extends the charging pipe of a parallelogram regulator 17 which is known in the case of centralheating boilers and which is arranged for the translation of temperature variations into revolutions of the pinion 18. On the pinion 18 there is fastened the end of the regulating cord 19 which extends over the guide roller 20 and the coil drum 21 to the suspended weight 22. The drum 21 is keyed on the shaft 12 so that the temperature variations in the shredder C result in an automatic movement of the shredder blades 13 in relation to the toothed portion 14 and consequently result in a variation of the degree of shredding. The apparatus here represented contains also an arrangement for the automatic control of the temperature in the shredder C by means of an adjustable central contact switch 23. This contains a clockwork mechanism by means of which the contact lever 24 is moved uniformly in a circle and makes for example a complete revolution in the time (for example four hours) provided for the entire carrying out of the process. Concentrically with the axis of the lever 24 there are annular contact pieces 25, 26 over which the lever 24 slides during its revolution. By means of these contacts electrical circuits are closed in which there is located besides the battery 27 either the coil 28 or the coil 29 of electromagnets. These coils control the cocks 30 and 31 by means of their movable cores. The cock 30 is located in the conduit 32 of the heating liquid and the cock 31 in the cooling-water conduit 33.

It will be clear from the drawing alone that the apparatus according to Figure 2 can work quite automatically after the contacts 25, 26 (assumed to be adjustable) have been secured in the correct position and the desired relationship between the temperature in the shredder and the degree of shredding is also produced by correct placing of the cord 19 on the drum 21.

The arrangement represented in Fig. 2 for producing automatic controls can hardly be carried out in the construction shown, which has been drawn in a very primitive manner for the purpose of clearness; such arrangements are however known in complete construction so that the representation may be restricted to a very simple constructional form.

The process according to the invention may be carried out in a particularly simple and practical manner in ordinary shredders for alkali-cellulose (according to Figure 2, but without possibility of adjustment of a shredding-blade shaft) if the alkali-cellulose is placed in such a shredder and the latter is run in the normal direction during the (second) part of the process proceeding at normal temperature and in the reverse direction during the (first) part of the process proceeding at higher temperature. When, in fact, the toothed shredding blades run in the reverse direction there occurs only a very considerably smaller shredding of the alkali-cellulose, chiefly only a loosening of the felted fibrous mass or a thorough mixing thereof. For the transference to the second part of the process (proceeding at lower temperature) all that is necessary is to reverse the direction of running of the rotating shredding blades and to shut off the heating. The above described mode of carrying out the process according to the invention has the advantage that it can be undertaken in any ordinary shredder so that new apparatus parts are not necessary.

I claim:—

1. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a normal temperature.

2. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a temperature, which is gradually reduced from about 50° C. to a normal value.

3. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a temperature, which is gradually reduced from about 50° C. to a normal value, whereby the adjustment of said mechanical treatments to the cellulose and the temperature takes place in mutual dependence upon each other.

4. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a normal temperature, whereby said treatments to the cellulose are carried out in one and the same receptacle.

5. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a temperature, which is gradually reduced from about 50° C. to a normal value, whereby said treatments to the cellulose are carried out in one and the same receptacle.

6. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a normal temperature, whereby said treatments to the cellulose are carried out in one and the same receptacle, which is provided with blades adapted to be rotated in a normal direction and a direction reversed thereto and having a shredding effect in the normal direction only, by causing the blades first to rotate for a period of approximately one hour in the reversed direction to mix and loosen the cellulose material and then causing the blades to rotate in the normal direction to shred the same material.

7. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneoosly therewith before the shredding of the cellulose takes place, and carrying out the shredding operation at a temperature, which is gradually reduced from about 50° C. to a normal value, whereby said treatments to the cellulose are carried out in one and the same receptacle, which is provided with blades adapted to be rotated in a normal direction and a direction reversed thereto and having a shredding effect in the normal direction only, by causing the blades first to rotate for a period of approximately one hour in the reversed direction to mix and loosen the cellulose material and then causing the blades to rotate in the normal direction to shred the same material.

8. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a temperature, which is gradually reduced from about 50° C. to a normal value, whereby the adjustment of said mechanical treatments to the cellulose and the temperature takes place in mutual dependence upon each other and said treatments to the cellulose are carried out in one and the same receptacle, which is provided with blades adapted to be rotated in a normal direction and a direction reversed thereto and having a shredding effect in the normal direction only, by causing the blades first to rotate for a period of approximately one hour in the reversed direction to mix and loosen the cellulose material and then causing the blades to rotate in the normal direction to shred the same material.

9. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a normal temperature, whereby said treatments to the cellulose are carried out in one and the same receptacle, which is provided with blades adapted to be rotated and to be adjusted with respect to their distance from a ledger plate, by adjusting first a comparatively large space between the rotating blades and the ledger plate to mix and loosen the cellulose material and then adjusting a small space between said blades and the ledger plate to shred the same material.

10. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a temperature, which is gradually reduced from about 50° C. to a normal value, whereby said treatments to the cellulose are carried out in one and the same receptacle which is provided with blades adapted to be rotated and to be adjusted with respect to their distance from a ledger plate, by adjusting first a comparatively large space between the rotating blades and the ledger plate to mix and loosen the cellulose material and then adjusting a small space between said blades and the ledger plate to shred the same material.

11. In a process for the accelerated preliminary maturing of alkali-cellulose, in which the cellulose is alkalized, pressed and shredded, the steps of subjecting the alkalized and pressed cellulose to an elevated temperature of about 50° C. for a period of approximately one hour and mixing and loosening the cellulose simultaneously therewith before the shredding of the cellulose takes place, and carrying out the shredding operation at a temperature, which is gradually reduced from about 50° C. to a normal value, whereby the adjustment of said mechanical treatments to the cellulose and the temperature takes place in mutual dependence upon each other, and said treatment to the cellulose are carried out in one and the same receptacle, which is provided with blades adapted to be rotated and to be adjusted with respect to their distance from a ledger plate, by adjusting first a comparatively large space between the rotating blades and the ledger plate to mix and loosen the cellulose material and then adjusting a small space between said blades and the ledger plate to shred the same material.

RUDOLF BRANDES.